(12) United States Patent
Park (10) Patent No.: US 12,222,853 B2
(45) Date of Patent: Feb. 11, 2025

(54) METHOD OF SHARING MEMORY RESOURCE FOR MEMORY CLOUD AND MEMORY RESOURCE SHARING SYSTEM USING THE SAME

(71) Applicant: COSIGNON, Hanam-si (KR)

(72) Inventor: Jang Ho Park, Hanam-si (KR)

(73) Assignee: COSIGNON, Hanam-si (KR)

( * ) Notice: Subject to any disclaimer, the term of this patent is extended or adjusted under 35 U.S.C. 154(b) by 42 days.

(21) Appl. No.: 18/143,177

(22) Filed: May 4, 2023

(65) Prior Publication Data

US 2024/0086313 A1    Mar. 14, 2024

(30) Foreign Application Priority Data

May 4, 2022    (KR) .......................... 10-2022-0055540

(51) Int. Cl.
G06F 12/02    (2006.01)

(52) U.S. Cl.
CPC .................................. *G06F 12/023* (2013.01)

(58) Field of Classification Search
None
See application file for complete search history.

(56) References Cited

U.S. PATENT DOCUMENTS

| | | | |
|---|---|---|---|
| 6,678,798 B1 * | 1/2004 | Kuskin ............... | G06F 12/0817 711/119 |
| 2003/0217115 A1 * | 11/2003 | Rowlands ........... | G06F 12/0817 709/214 |
| 2018/0157589 A1 * | 6/2018 | Jayasena ............ | G06F 12/0824 |
| 2023/0289190 A1 * | 9/2023 | Parle ..................... | G06F 9/3887 |
| 2023/0289242 A1 * | 9/2023 | Guo ....................... | G06F 9/522 |
| 2023/0409198 A1 * | 12/2023 | Zhou ..................... | G06F 15/167 |

FOREIGN PATENT DOCUMENTS

| | | |
|---|---|---|
| KR | 1020170035797 A | 3/2017 |
| KR | 1020200057397 A | 5/2020 |
| KR | 1020210132348 A | 11/2021 |

* cited by examiner

*Primary Examiner* — Kevin Verbrugge
(74) *Attorney, Agent, or Firm* — Dinsmore & Shohl LLP; Yongsok Choi, Esq.

(57) ABSTRACT

Provided is a memory resource sharing system including a first memory, a first memory subsystem configured to identify and distribute resources of the first memory and to control data transmission of the first memory, and a first processor unit including a first processor connected to the first memory subsystem, a second memory, a second memory subsystem configured to identify and distribute resources of the second memory and to control data transmission of the second memory, and a second processor unit including a second processor connected to the second memory subsystem, wherein the first memory subsystem and the second memory subsystem are communicatively connected to each other through a memory bus.

11 Claims, 8 Drawing Sheets

METHOD OF SHARING MEMORY RESOURCE FOR MEMORY CLOUD AND MEMORY RESOURCE SHARING SYSTEM USING THE SAME

CROSS-REFERENCE TO RELATED APPLICATIONS

This claims priority to Korean Patent Application No. 10-2022-0055540 filed on May 4, 2022, the entire contents of which are herein incorporated by reference.

BACKGROUND

1. Field

The present disclosure relates to a method of sharing memory resources for a memory cloud and a memory resource sharing system using the method. More specifically, the present disclosure relates to a memory control interoperation method for configuring a memory cloud capable of sharing memory resources between heterogeneous processors, and a network configuration of a memory resource sharing system for the method.

2. Description of the Related Art

A semiconductor technology of the related art has also developed individual memory configuration technology to maximize an effective bandwidth of a CPU and a GPU, but currently there is a problem that there is no technology for a memory cluster configuration optimized for operation for large capacity multicasting, etc.

In addition, when a large amount of operation data is required, such as a deep neural network (DNN), the existing method of increasing the capacity of individual DRAM or expanding a dual in-line memory module (DIMM) may be applied, but in consideration of cost, limited scalability, and dependence on memory suppliers, the existing method is not the best alternative, and thus, it is necessary to apply a new technology that needs to change the basis of the computing memory network structure system.

Recently, deep learning application technology has been recognized as a technology that may be used in devices such as servers and PCs having smooth power supply and high computing power due to operation intensive problems and high memory bandwidth requirements, and a market of the deep learning application technology has been formed. In addition, as deep learning lightweight technology and model compression technology are advanced and application specific integrated circuit (ASIC) semiconductor technology enters an ultra-fine process, technology for optimizing scalable and interoperable memory network configuration is required to utilize artificial intelligence (AI) application.

In addition, in the case of the related art due to the enormous amount of data and operation of AI, there is a strong demand for servers to reduce carbon emissions due to power consumption, and thus, it is necessary to develop a new technology of processor and memory network configuration having high operation efficiency.

In addition, the core of AI technology is software (SW) technology, but high-performance hardware (HW) is essential to implement complex AI SW, and accordingly, a next-generation memory sharing solution that may solve the problem of data movement congestion in the field of AI and big data processing by adding an operation function to a memory semiconductor is required.

PRIOR ART DOCUMENT

Patent Documents (Patent Document 0001) Korean Laid-Open Patent Application No. 10-2017-0035797

SUMMARY

The present disclosure provides a memory control interoperation method for configuring a memory cloud capable of sharing memory resources between heterogeneous processors, and a memory resource sharing system for the method.

The present disclosure also provides a memory resource sharing method and system capable of sharing and integrally operating various types of memories optimized for scalability and interoperability of heterogeneous systems.

The present disclosure also provides a bridge control method and system for a computing system that may configure heterogeneous convergence memory clusters capable of convergence and interoperation of memory networks by enabling mutual access to heterogeneous processors and memories connected to physically different chips.

The present disclosure also configures a memory network through a processor-to-processor as well as a memory bridge IC connected between processors, thereby configuring a memory cloud network capable of ultra-high speed data transmission by enabling the number of processors and memory capacity to be independently scalable and minimizing a delay time to several ms or less during memory access.

The problems of the present disclosure are not limited to those mentioned above, and other technical problems not mentioned will be clearly understood by those skilled in the art from the following description.

In an embodiment of the present disclosure, there is provided a memory resource sharing system including a first memory, a first memory subsystem configured to identify and distribute resources of the first memory and to control data transmission of the first memory, a first processor unit including a first processor connected to the first memory subsystem, a second memory, a second memory subsystem configured to identify and distribute resources of the second memory and to control data transmission of the second memory, and a second processor unit including a second processor connected to the second memory subsystem, wherein the first memory subsystem and the second memory subsystem are communicatively connected to each other through a memory bus.

When the first memory subsystem determines that a capacity of resources of the first memory is insufficient in response to a memory resource request of the first processor, the first memory subsystem may be configured to transmit an access permission request message with respect to resources of the second memory to the second memory subsystem.

When the second memory subsystem determines that the capacity of the resources of the second memory is sufficient in response to the access permission request message, the second memory subsystem may be configured to transmit an access permission message with respect to the resources of the second memory to the first memory subsystem.

When the first memory subsystem determines that data corresponding to a data read command does not exist in the first memory in response to the data read command of the first processor, the first memory subsystem may be configured to transmit an access permission request message with respect to data of the second memory to the second memory subsystem.

When the second memory subsystem determines that data corresponding to the data read command exists in the second memory in response to the access permission request message, the second memory subsystem may be configured to transmit an access permission message with respect to the data of the second memory to the first memory subsystem.

When the first memory subsystem determines that it is impossible to execute a data write command in the first memory in response to the data write command of the first processor, the first memory subsystem may be configured to transmit an access permission request message with respect to the second memory to the second memory subsystem.

When the second memory subsystem determines that it is possible to execute the data write command in the second memory in response to the access permission request message, the second memory subsystem may be configured to execute the data write command in the second memory.

The memory resource sharing system may further include a first memory bridge integrated circuit (IC) that includes a fifth memory and a first memory bridge subsystem configured to identify and distribute resources of the fifth memory and control data transmission of the fifth memory, wherein the first memory bridge subsystem may be communicatively connected to the first memory subsystem and the second memory subsystem through the memory bus.

The memory resource sharing system may further include a second memory bridge IC that includes a sixth memory and a second memory bridge subsystem configured to identify and distribute resources of the sixth memory and control data transmission of the sixth memory, wherein the second memory bridge subsystem may be communicatively connected to the first memory bridge subsystem through the memory bus.

The memory resource sharing system may further include a third memory, a first memory subsystem configured to identify and distribute resources of the third memory and control data transmission of the third memory, and a third processor unit including a third processor connected to the third memory subsystem, wherein the third memory subsystem may be communicatively connected to the first memory bridge subsystem through the memory bus, and when the first memory subsystem and the third memory subsystem are not connected to each other through the memory bus, and when the first memory subsystem determines that the capacity of the resources of the first memory is insufficient in response to the memory resource request of the first processor, the first memory subsystem may be configured to transmit an access permission request message with respect to resources of the third memory to the third memory subsystem through the first memory bridge subsystem.

DETAILED DESCRIPTION

Hereinafter, with reference to the accompanying drawings, the present disclosure will be described in detail so that those skilled in the art may easily implement the present disclosure. However, the present disclosure may be embodied in many different forms and is not limited to the embodiments described herein.

Terms used herein are for describing the embodiments and are not intended to limit the present disclosure. In the specification, singular forms also include plural forms unless specifically stated otherwise in a phrase.

As used herein, "comprises" and "comprising" do not preclude the presence or addition of one or more other components, steps, operations, and/or devices of the mentioned components, steps, operations, and/or devices.

In addition, in describing the present disclosure, when it is determined that a detailed description of a related known technology may obscure the gist of the present disclosure, the detailed description thereof will be omitted.

Hereinafter, embodiments according to the present disclosure will be described in detail with reference to the accompanying drawings. The configuration of the present disclosure and the resulting operating effect will be clearly understood through the following detailed description.

Figure 1A:
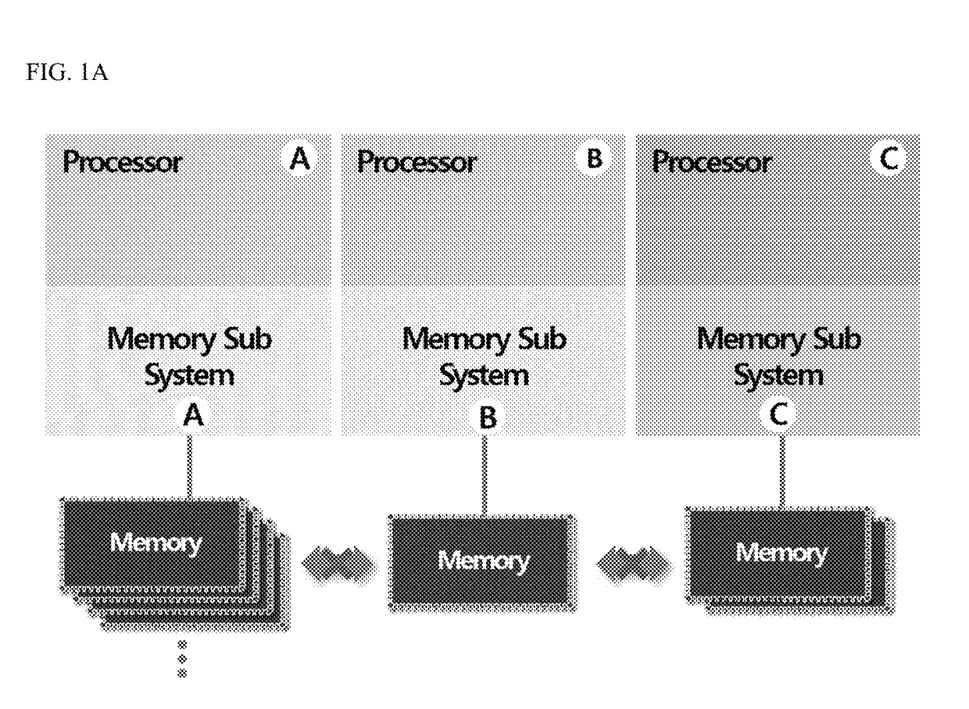
FIG. 1A is a conceptual diagram for explaining problems of a single memory control technology according to the related art.

FIG. 1A is a conceptual diagram for explaining problems of a single memory control technology according to the related art.

Referring to FIG. 1A, heterogeneous processors 11, 21, and 31 manufactured by different manufacturers or having different specifications, functions, and uses respectively control memories 13, 23, and 33 connected to the respective processors 11, 21, and 31 through memory subsystems 12, 22, and 32 for memory control suitable for the respective processors 11, 21, and 31 and use respective memory resources. At this time, since convergence or interoperability of memory networks is impossible between the memories 13, 23, and 33 controlled through the different memory subsystems 12, 22, and 32, there is a problem in that each processor is capable of controlling and using only a single memory connected through a corresponding memory subsystem. In such a structure of the related art, it is impossible to share memory resources between processors of the same type or different types, and it is also impossible to access memories connected to physically different chips.

Figure 1B:
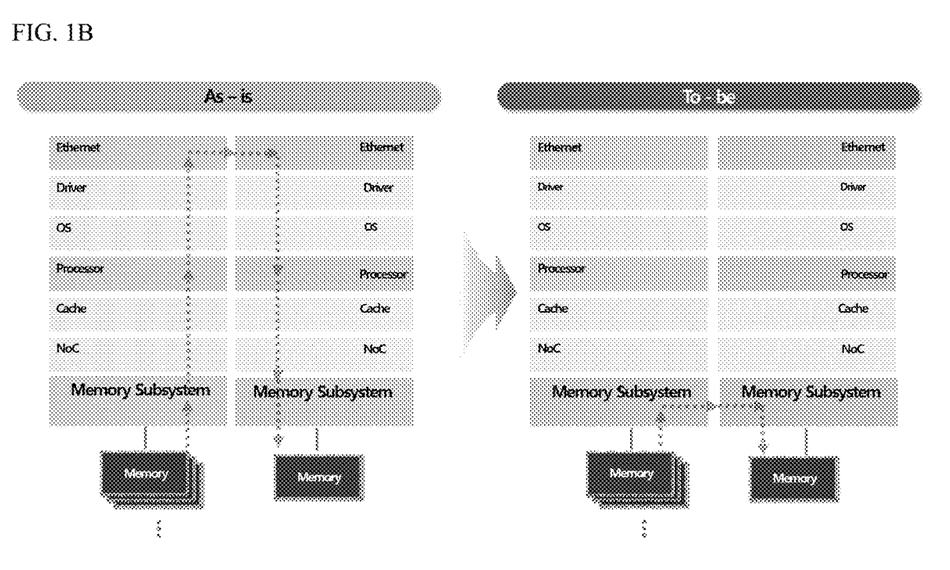
FIG. 1B is a conceptual diagram for explaining the purpose of a memory resource sharing method and system for a memory cloud according to an embodiment of the present disclosure.

FIG. 1B is a conceptual diagram for explaining the purpose of a memory resource sharing method and system for a memory cloud according to an embodiment of the present disclosure.

In order to transmit data between different memory resources of the related art, as shown in the left figure, since data is moved from a memory through a process of several stages such as a memory subsystem, a network on chip (NoC), cache, a processor, an operating system (OS), a driver, an Ethernet communication network, etc., it takes a lot of time for data transmission.

However, in the case of a memory resource sharing system for a memory cloud proposed in the present disclosure, as shown in the right figure, by configuring a separate data transmission channel through a memory bus capable of transmitting data between memory subsystems responsible for different memory resources, data transmission is possible between memory subsystems at a lower level without having to transfer data from a memory through a processor level to an Ethernet network level, and thus, a memory resource convergence and interoperation solution optimized in terms of time and efficiency may be provided. Here, the memory cloud means a new system implemented to be fast accessible by sharing respective memory resources connected to a plurality of processors of the same type or different types, and refers to a system capable of providing common memory resources to a plurality of heterogeneous processors, for example, CPUs, GPUs, and NPUs, so as to be sharable, as multiple memory use subjects. A detailed operation of the memory resource sharing system according to the present disclosure will be described below.

Figure 2:
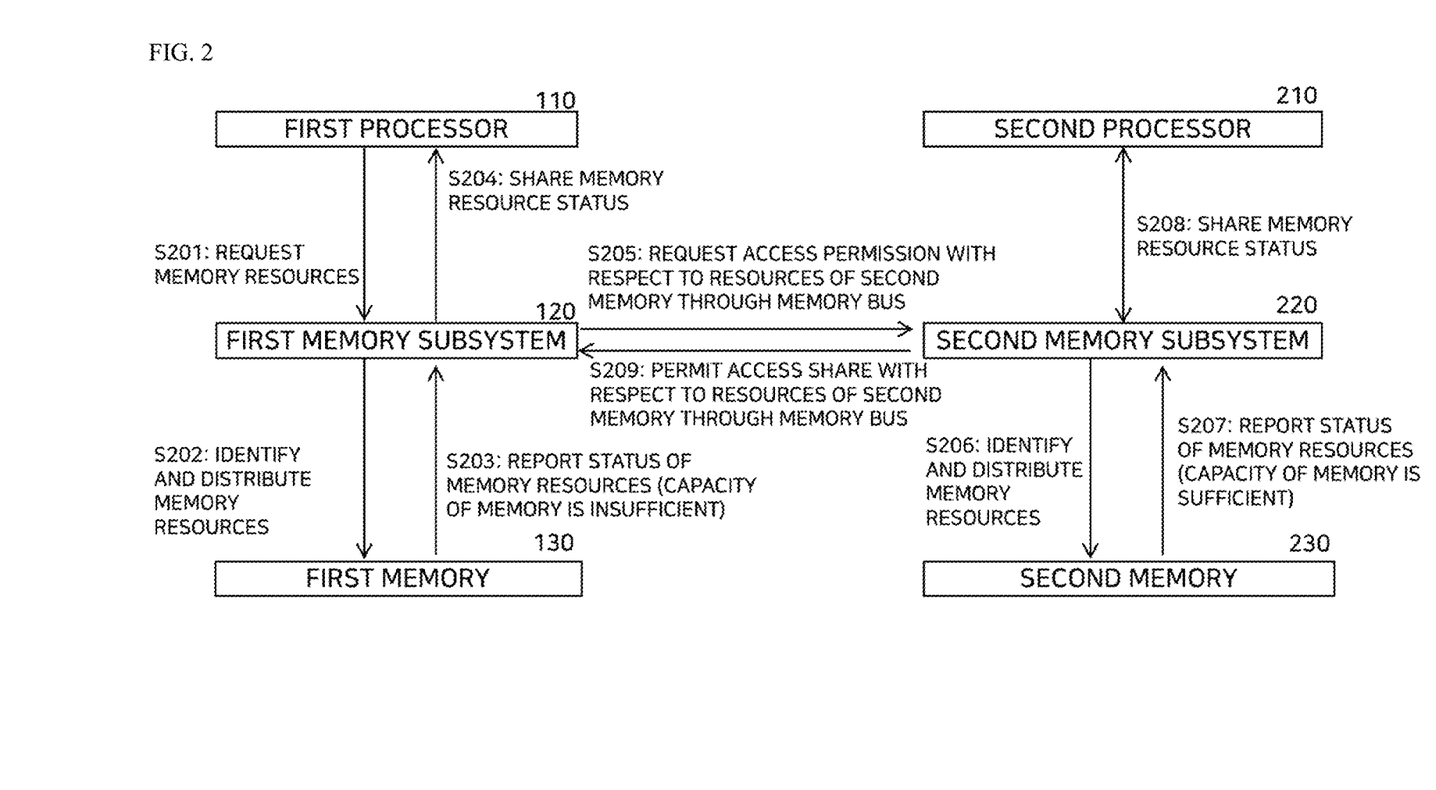
FIG. 2 is a block diagram illustrating a memory resource sharing process of a memory resource sharing system according to an embodiment of the present disclosure.

FIG. 2 is a block diagram illustrating a memory resource sharing process of a memory resource sharing system according to an embodiment of the present disclosure. Referring to FIG. 2, a first processor unit 100 may include a first processor 110, a first memory subsystem 120, and a first memory 130, a second processor unit 200 may include a second processor 210, a second memory subsystem 220, and a second memory 230, and each of the first processor unit 100 and the second processor unit 200 may be configured as one individual integrated circuit (IC).

Here, the first processor unit 100 and the second processor unit 200 may be configured as heterogeneous systems. For example, the first processor 110 and the second processor 210 may be different types of processors manufactured by different manufacturers, or may be processing units of different uses or types, such as a central processing unit (CPU), a graphic processing unit (GPU), or neural processing unit (NPU), and may be respectively connected to the first memory subsystem 120 and the second memory subsystem 220.

In addition, a memory subsystem means a driving auxiliary system of a memory system including a memory controller for receiving memory access requests from subjects reading and writing data from and to a memory, stably transmitting memory driving commands and data to the memory, and reading, writing, and preserving memory data, physical layer PHY, input/output (IO), etc. Each of the first memory subsystem 120 and the second memory subsystem 220 may be configured to identify and distribute resources of the first memory 130 or the second memory 230 and control data transmission of the first memory 130 or the second memory 230, the first memory subsystem 120 and the second memory subsystem 220 may be connected through a memory bus and communicable, and configured to support various memory protocols.

Here, the first memory 130 or the second memory 230 may include a volatile memory and a non-volatile memory, and the volatile memory may include a random access memory (RAM) requiring a high processing speed, for example, various memories capable of random access, such as DRAM, MRAM, STT-MRAM, PRAM, RRAM, etc. In addition, for example, each of the first memory 130 and the second memory 230 may include one or more of memory types having different standards and protocols, such as DDRx such as DDR3, DDR4, and DDR5, or LPDDRx such as LPDDR3, LPDDR4, and LPDDR5.

Referring to FIG. 2, as an example of the memory resource sharing process, a process of utilizing a shared second memory resource rather than its own memory when the capacity of a first memory resource is insufficient is shown. First, the first processor 110 may request memory resources from the first memory subsystem 120 (S201).

The first memory subsystem 120 may identify the memory resources of the first memory 130 and distribute (allocate) the resources (S202), and the first memory 130 may report the status of memory resources to the first memory subsystem 120, and at this time, determine whether the capacity (space) of the first memory 130 is in an insufficient state or in a sufficient state where memory allocation is possible (S203).

At this time, the first memory subsystem 120 may share the memory resource status, such as whether the capacity of the first memory 130 is in the insufficient state or in the sufficient state where memory allocation is possible, with the first processor 110 (S204), and when it is determined that the resource capacity of the first memory 130 is insufficient, the first memory subsystem 120 may transmit an access permission request message with respect to resources of the second memory 230 to the second memory subsystem 220 of the second processor unit 200 through the memory bus (S205).

The second memory subsystem 220 may identify and distribute memory resources of the second memory 230 in response to the access permission request message (S206), and at this time, may determine whether the capacity (space) of the second memory 230 is in an insufficient state or in a sufficient state where memory allocation is possible (S207).

The second memory subsystem 220 may share the memory resource status, such as whether the capacity of the second memory 230 is in the insufficient state or in the sufficient state where memory allocation is possible, with the second processor 210 (S208), and when it is determined that the resource capacity of the second memory 230 is sufficient, may transmit an access permission message with respect to resources of the second memory 230 to the first memory subsystem 120 (S209).

Through this process, when the resource capacity of the first memory 130 is insufficient, the first processor 110 may receive and access (use) the resources of the second memory 230, and in particular, memory sharing and data transmission are possible through data transmission between the first memory subsystem 120 and the second memory subsystem 220 at a lower level than a processor, and thus, ultra-high speed data transmission is possible by minimizing a delay time to several ms or less during memory access between memory resources of different types or locations.

Figure 3A:
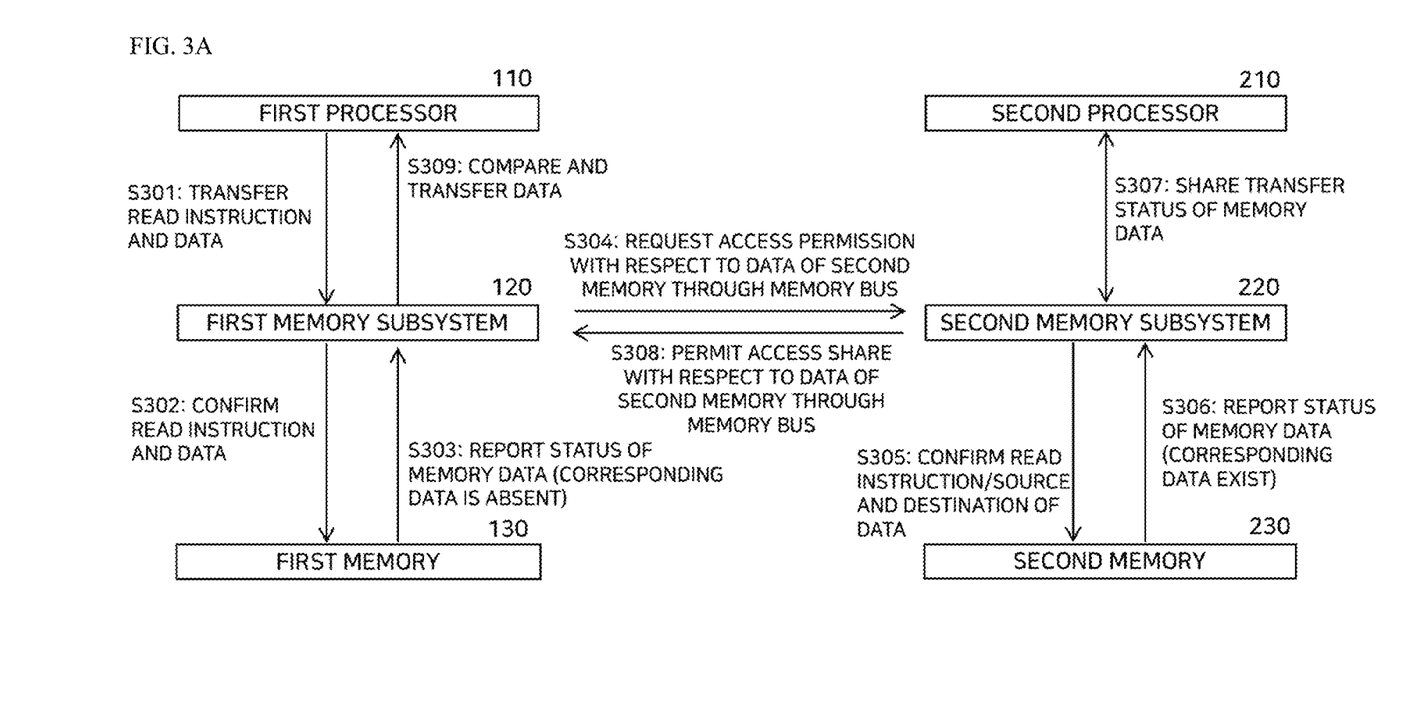
FIGS. 3A and 3B are a block diagram and a flowchart illustrating a memory data read process of a memory resource sharing system according to an embodiment of the present disclosure.
Figure 3B:
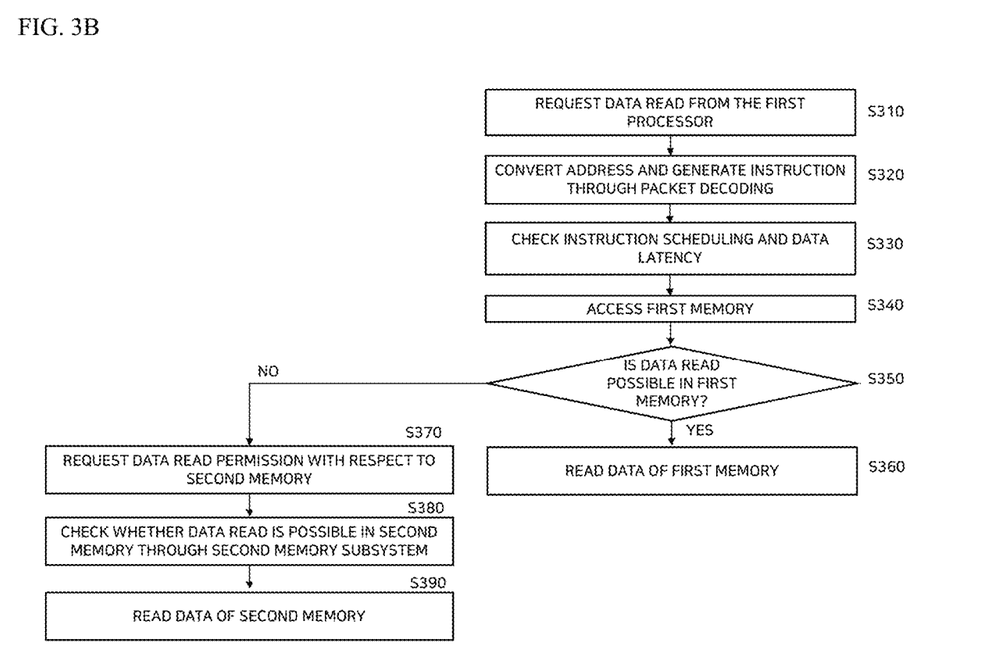

FIGS. 3A and 3B are a block diagram and a flowchart illustrating a memory data read process of a memory resource sharing system according to an embodiment of the present disclosure.

Referring to FIG. 3A, as an example of a read process while using memory data of a memory resource system, a process is shown when the first processor 110 needs to read data of the second memory 230. First, the first processor 110 may transfer an instruction related to a data read command and a data address to the first memory subsystem 120 (S301).

The first memory subsystem 120 may confirm the read instruction and the data address in response to the data read command (S302), and the first memory 130 may report the status of the memory data to the first memory subsystem 120, and, at this time, determine whether the corresponding data exists in the first memory 130 (S303).

At this time, when the first memory subsystem 120 determines that data corresponding to the data read command does not exist in the first memory 130 (determines that the corresponding data is absent), the first memory subsystem 120 may transmit an access permission request message with respect to data of the second memory 230 to the second memory subsystem 220 of the second processor unit 200 through a memory bus (S304).

The second memory subsystem 220 may confirm the read instruction and source and destination of the data through the second memory 230 in response to the access permission request message (S305), and, at this time, may determine whether data corresponding to the data read command of the first processor 110 exists in the second memory 230 (S306).

When the second memory subsystem 220 determines that the data corresponding to the data read command exists in the second memory 230, the second memory subsystem 220 may share a transfer status of the memory data with the second processor 210 (S307), and may transmit an access permission message with respect to the corresponding data of the second memory 230 to the memory subsystem 120 (S308). In addition, the first memory subsystem 120 may compare data accessed through the second memory 230 and transfer the data to the first processor 110 (S309).

Through this process, the first processor 110 may access the second memory 230 to read the corresponding data when the necessary corresponding data does not exist in the first memory 130.

Also, referring to FIG. 3B, first, the data read command may be requested from the first processor 110 to the first memory subsystem 120 (S310).

The first memory subsystem 120 may convert an address and generate an instruction through packet decoding of the data read command (S320), and may also check instruction scheduling and data latency (S330).

Next, the first memory subsystem 120 may access the first memory 130 (S340) and determine whether a data read is possible in the first memory 130 (S350).

At this time, when the corresponding data exists in the first memory 130 in the first memory subsystem 120 and it is determined that the data read is possible, the first memory subsystem 120 may execute the data read command (S360).

Meanwhile, when the first memory subsystem 120 determines that the corresponding data is impossible to read because the corresponding data is absent in the first memory 130, the first memory subsystem 120 may transmit a data read permission request message with respect to the second memory 230 to the second memory subsystem 220 (S370).

At this time, the second memory subsystem 220 may determine whether the corresponding data exists in the second memory 230, check whether the data read is possible (S380), and, when the data read is possible, may execute a read command of corresponding data from the first processor 110 by using the second memory 230 (S390). When the data read is impossible in the second memory 230, the second memory subsystem 220 may transfer a memory status of the second memory 230 to the first memory subsystem 120.

Figure 4A:
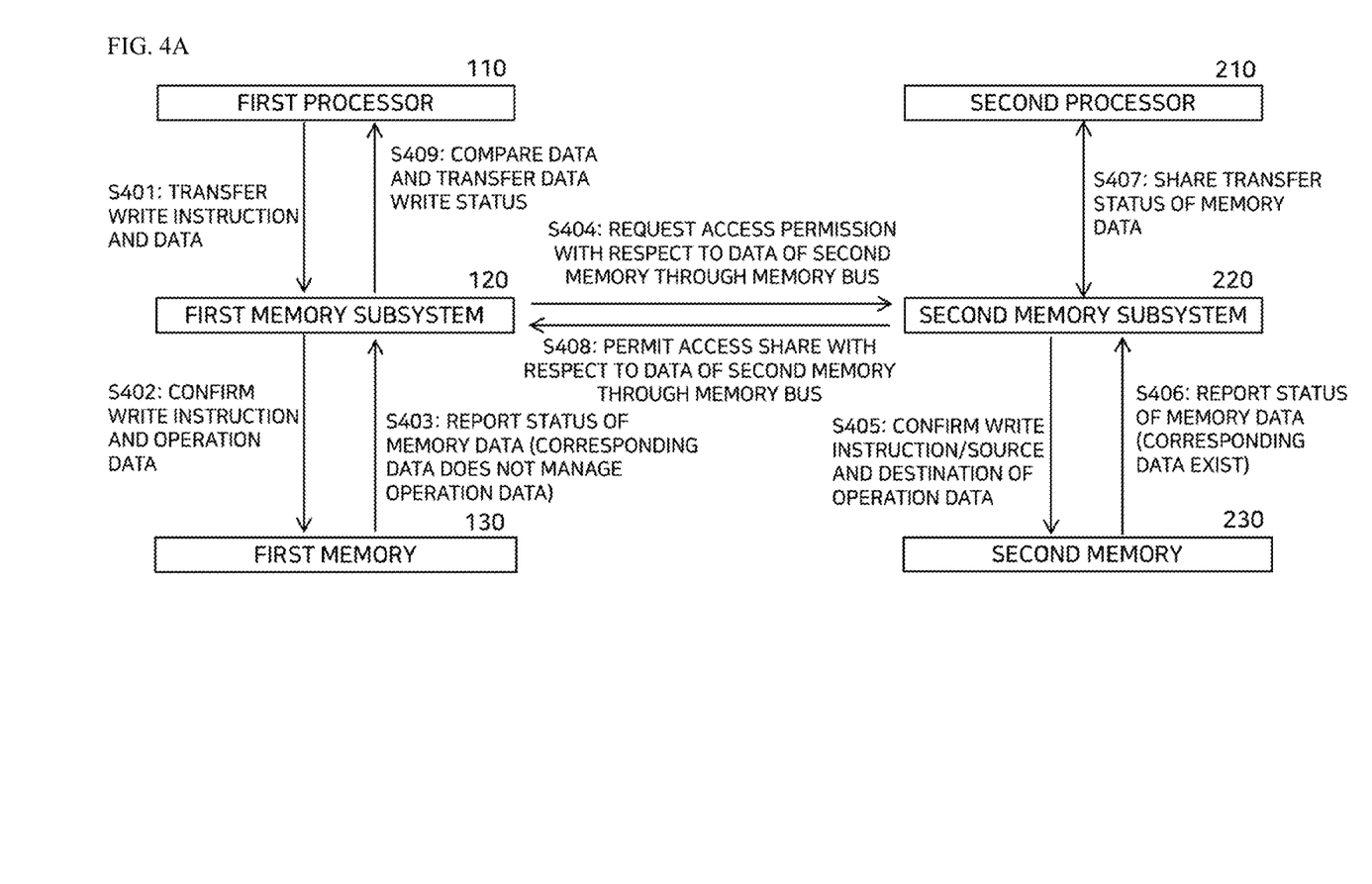
FIGS. 4A and 4B are a block diagram and a flowchart illustrating a memory data writ process of a memory resource sharing system according to an embodiment of the present disclosure.
Figure 4B:
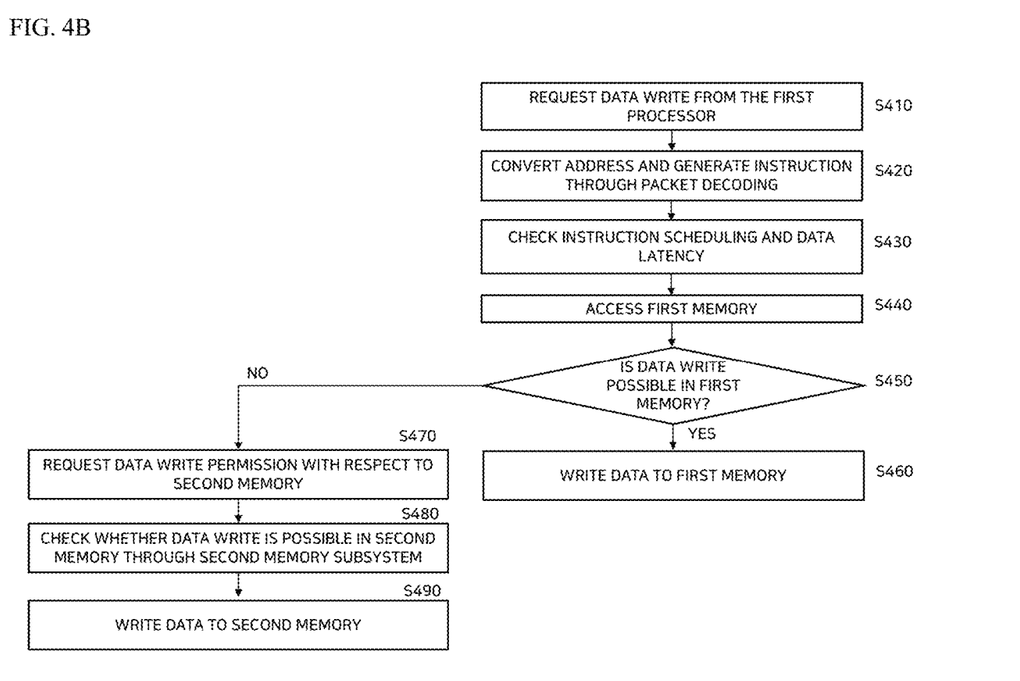

FIGS. 4A and 4B are a block diagram and a flowchart illustrating a memory data writ process of a memory resource sharing system according to an embodiment of the present disclosure.

Referring to FIG. 4A, as an example of a write process while using memory data of a memory resource system, a process is shown when the first processor 110 needs to write data of the second memory 230. First, the first processor 110 may transfer an instruction related to a data write command and an operation data address to the first memory subsystem 120 (S401).

The first memory subsystem 120 may confirm the write instruction and the operation data address in response to the data write command (S402), and the first memory 130 may report the status of the memory data to the first memory subsystem 120, and, at this time, determine whether the corresponding data manages operation data in the first memory 130 (S403).

At this time, when the first memory subsystem 120 determines that the operation data corresponding to the data write command does not exist in the first memory 130, the first memory subsystem 120 may transmit an access permission request message with respect to data of the second memory 230 to the second memory subsystem 220 of the second processor unit 200 through a memory bus (S404).

The second memory subsystem 220 may determine the write instruction and source and destination of the operation data through the second memory 230 in response to the access permission request message (S405), and, at this time, may determine whether operation data corresponding to the data write command of the first processor 110 exists in the second memory 230 (S406).

When the second memory subsystem 220 determines that the operation data corresponding to the data write command exists in the second memory 230, the second memory subsystem 220 may share a transfer status of the memory data with the second processor 210 (S407), and may transmit an access permission message with respect to the corresponding data of the second memory 230 to the memory subsystem 120 (S408). In addition, the first memory subsystem 120 may compare data accessed through the second memory 230 and transfer a data write status to the first processor 110 (S409).

Through this process, the first processor 110 may access the second memory 230 and perform a write operation of the corresponding data when the corresponding data necessary for the write operation does not exist in the first memory 130.

Also, referring to FIG. 4B, first, the data write command may be requested from the first processor 110 to the first memory subsystem 120 (S410).

The first memory subsystem 120 may convert an address and generate an instruction through packet decoding of the data write command (S420), and may also check instruction scheduling and data latency (S430).

Next, the first memory subsystem 120 may access the first memory 130 (S440) and determine whether a data write is possible in the first memory 130 (S450). For example, the first memory subsystem 120 may determine whether the data write is possible by determining whether a memory space of the first memory 130 is insufficient.

At this time, when it is determined that the data write is possible, the first memory subsystem 120 may execute the data write command (S460).

Meanwhile, when the first memory subsystem 120 determines that the data write is impossible in the first memory 130, the first memory subsystem 120 may transmit a data write permission request message with respect to the second memory 230 to the second memory subsystem 220 (S470).

At this time, the second memory subsystem 220 may check whether the data write is possible in the second memory 230 (S480), and, when the data write is possible, may execute the data write command of the first processor 110 in the second memory 230 (S490). When the data write is impossible in the second memory 230, the second memory subsystem 220 may transfer a memory space status of the second memory 230 to the first memory sub system 120.

Figure 5:
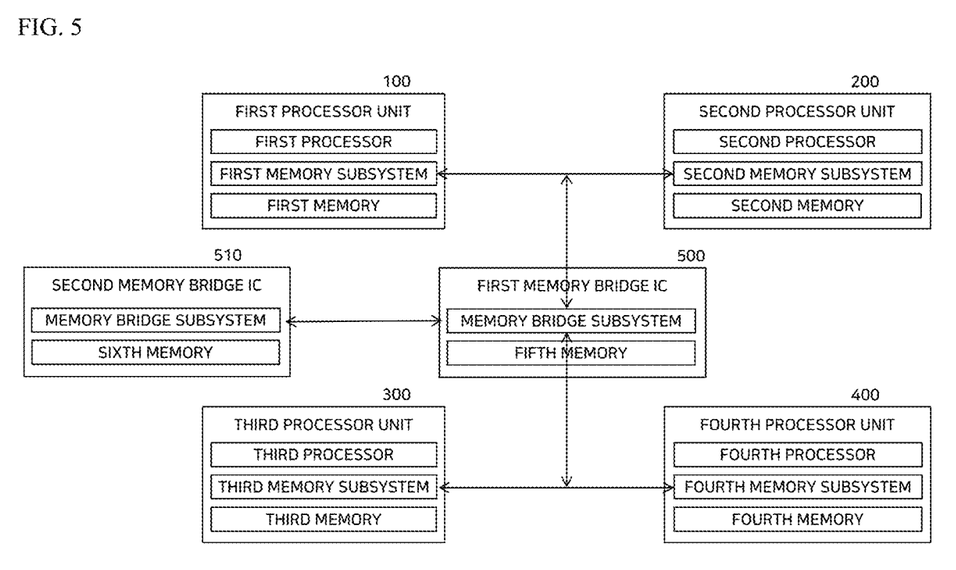
FIG. 5 is a block diagram illustrating a configuration of a memory resource sharing system including a plurality of processor units and a plurality of memory bridge ICs according to an embodiment of the present disclosure.

FIG. 5 is a block diagram illustrating a configuration of a memory resource sharing system including a plurality of processor units and a plurality of memory bridge ICs according to an embodiment of the present disclosure.

Referring to FIG. 5, as shown in FIGS. 2 and 3, the memory resource sharing system includes a first processor unit 100 and a second processor unit 200 each including its own processor, memory subsystem and memory, and similarly, further includes a third processor unit 300 and a fourth processor unit 400 each including its own processor, memory subsystem and memory. At this time, as shown in FIGS. 2 and 3, the first processor unit 100 and the second processor unit 200 are connected through a memory bus between the first memory subsystem 120 and the second memory subsystem 220. However, the first memory subsystem 120 and the second memory subsystem 220 are not directly connected to memory subsystems of the third processor unit 300 and the fourth processor unit 400, and are connected through the memory bus between the memory subsystems of the third processor unit 300 and the fourth processor unit 400.

In addition, each of the first processor unit 100, the second processor unit 200, the third processor unit 300, the fourth processor unit 400, a first memory bridge IC 500, and a second memory bridge IC 510 shown in FIG. 2 may be configured as one individual IC. In addition, a first processor in the first processor unit 100, a second processor in the second processor unit 200, a third processor in the third processor unit 300, and a fourth processor in the fourth processor unit 400 may be respectively connected to chips physically different from the first memory, the second memory, a third memory, and a fourth memory. As described above, a processor and a memory in each processor unit are implemented in an off-chip form, thereby sharing a larger memory resource capacity and utilizing memory sharing resources in a non-volatile manner.

In addition, the memory resource sharing system may further include the first memory bridge IC 500 communicatively connected to the first memory subsystem 120 and the second memory subsystem 220 through the memory bus, and connected to and configured to be communicable with a third memory subsystem of the third processor unit 300 and a fourth memory subsystem of the fourth processor unit 400 through the memory bus. Unlike the first processor unit 100 to the fourth processor unit 400, the first memory bridge IC 500 does not include its own processor, but may be configured in the form of a bridge IC in which a memory network router and its own memory control function are embedded, may serve as the memory network router that manages and relays memory traffic paths between processors, and may perform memory control technology capable of operating memory resources connected by itself. The first memory bridge IC 500 includes a fifth memory and a first memory bridge subsystem configured to identify and distribute resources of the fifth memory and control data transmission of the fifth memory, and may share resources of the fifth memory according to data transmission between the memory subsystem and the memory bridge subsystem according to needs of the first processor unit 100 to the fourth processor unit 400.

For example, when it is impossible to use resources of the second memory 230 of the second processor unit 200 in response to a memory resource request of the first processor 110 of the first processor unit 100, the first memory bridge IC 500 may transmit an access permission request message with respect to the resources of the fifth memory through the first memory bridge subsystem of the first memory bridge IC 500 or may transmit an access permission request message with respect to resources of the third memory to the third memory subsystem in order to use the resources of the third memory of the third processor unit 300 via the first memory bridge subsystem. For example, when it is possible to use the resources of the third memory of the third processor unit 300, the first processor 110 may be accessible to the resources of the third memory through a third memory subsystem connected through the memory bridge subsystem of the first memory bridge IC 500.

In addition, the memory resource sharing system may further include the second memory bridge IC 510 additionally connected to the first memory bridge IC 500, the second memory bridge IC 510 may include a sixth memory and a second memory bridge subsystem configured to identify and distribute resources of the sixth memory and control data transmission of the sixth memory, and the second memory bridge subsystem may be communicatively connected to the first memory bridge subsystem through a memory bus. For example, when it is impossible to use resources of the fifth memory of the first memory bridge IC 500 because the resources are insufficient in response to a memory resource request of the first processor 110 of the first processor unit 100, the second memory bridge IC 510 may determine a resource status of the sixth memory through the second memory bridge subsystem of the second memory bridge IC 510, and, when it is possible to use resources of the sixth memory because the capacity of the resources of the sixth memory is sufficient, the first processor 110 may be accessible to the resources of the sixth memory through the memory bridge subsystem of the first memory bridge IC 500 and the second memory bridge IC 510 and expand and share the memory.

According to the present disclosure, a memory control interoperation method for configuring a memory cloud capable of sharing memory resources between heterogeneous processors and a memory resource sharing system for the method may be provided.

In addition, according to the present disclosure, a memory resource sharing method and system capable of sharing and integrally operating various types of memories optimized for scalability and interoperability of heterogeneous systems may be provided.

In addition, according to the present disclosure, a bridge control method and system for a computing system that may configure heterogeneous convergence memory clusters capable of convergence and interoperation of memory networks by enabling mutual access to heterogeneous processors and memories connected to physically different chips may be provided.

In addition, according to the present disclosure, a memory network through a processor-to-processor as well as a memory bridge IC connected between processors, thereby configuring a memory cloud network capable of ultra-high-speed data transmission by enabling the number of processors and memory capacity to be independently scalable and minimizing a delay time to several ms or less during memory access may be provided.

The effects of the present disclosure are not limited to those mentioned above, and other effects not mentioned will be clearly understood by those skilled in the art from the following description.

Embodiments disclosed in the specification of the present disclosure are only examples, and the present disclosure is not limited thereto. The scope of the present disclosure should be construed by the claims below, and all techniques within the scope equivalent thereto should be construed as being included in the scope of the present disclosure.

What is claimed is:

1. A memory resource sharing system comprising:
a first memory;
a first memory subsystem configured to identify and distribute resources of the first memory and to control data transmission of the first memory;
a first processor unit comprising a first processor connected to the first memory subsystem;
a second memory;
a second memory subsystem configured to identify and distribute resources of the second memory and to control data transmission of the second memory; and
a second processor unit comprising a second processor connected to the second memory subsystem,
wherein the first processor unit communicates with the second processor unit via an Ethernet communication channel, and
the first memory subsystem communicates with the second memory subsystem through a memory bus that is a data transmission channel separate from the Ethernet communication channel.

2. The memory resource sharing system of claim 1, wherein, when the first memory subsystem determines that a capacity of resources of the first memory is insufficient in response to a memory resource request of the first processor, the first memory subsystem is configured to transmit an access permission request message with respect to resources of the second memory to the second memory subsystem.

3. The memory resource sharing system of claim 2, wherein, when the second memory subsystem determines that the capacity of the resources of the second memory is sufficient in response to the access permission request message, the second memory subsystem is configured to transmit an access permission message with respect to the resources of the second memory to the first memory subsystem.

4. The memory resource sharing system of claim 1, wherein, when the first memory subsystem determines that data corresponding to a data read command does not exist in the first memory in response to the data read command of the first processor, the first memory subsystem is configured to transmit an access permission request message with respect to data of the second memory to the second memory subsystem.

5. The memory resource sharing system of claim 4, wherein, when the second memory subsystem determines that data corresponding to the data read command exists in the second memory in response to the access permission request message, the second memory subsystem is configured to transmit an access permission message with respect to the data of the second memory to the first memory subsystem.

6. The memory resource sharing system of claim 1, wherein, when the first memory subsystem determines that it is impossible to execute a data write command in the first memory in response to the data write command of the first processor, the first memory subsystem is configured to transmit an access permission request message with respect to the second memory to the second memory subsystem.

7. The memory resource sharing system of claim 6, wherein, when the second memory subsystem determines that it is possible to execute the data write command in the second memory in response to the access permission request message, the second memory subsystem is configured to execute the data write command in the second memory.

8. The memory resource sharing system claim 1, further comprising a first memory bridge integrated circuit (IC), the first memory bridge IC comprising a fifth memory and a first memory bridge subsystem configured to identify and distribute resources of the fifth memory and control data transmission of the fifth memory,
wherein the first memory bridge subsystem is communicatively connected to the first memory subsystem and the second memory subsystem through the memory bus.

9. The memory resource sharing system claim 8, further comprising a second memory bridge IC, the second memory bridge IC comprising a sixth memory and a second memory bridge subsystem configured to identify and distribute resources of the sixth memory and control data transmission of the sixth memory,
wherein the second memory bridge subsystem is communicatively connected to the first memory bridge subsystem through the memory bus.

10. The memory resource sharing system claim 8, further comprising
a third memory;
a third memory subsystem configured to identify and distribute resources of the third memory and control data transmission of the third memory; and
a third processor unit comprising a third processor connected to a third memory subsystem,
wherein the third memory subsystem is communicatively connected to the first memory bridge subsystem through the memory bus, and
when the first memory subsystem and the third memory subsystem are not connected to each other through the memory bus, and when the first memory subsystem determines that a capacity of the resources of the first memory is insufficient in response to a memory resource request of the first processor, the first memory subsystem is configured to transmit an access permission request message with respect to resources of the third memory to the third memory subsystem through the first memory bridge subsystem.

11. The memory resource sharing system of claim 1, wherein the first memory subsystem is configured to transmit an access permission request message to the second memory subsystem without transferring data from the first memory through the first processor unit to the Ethernet communication channel.

* * * * *